(12) United States Patent
Fourney

(10) Patent No.: US 8,167,118 B2
(45) Date of Patent: May 1, 2012

(54) CONVEYORS, BELTS, AND MODULES WITH ACTUATED ROLLERS

(75) Inventor: Matthew L. Fourney, Laurel, MD (US)

(73) Assignee: Laitram, L.L.C., Harahan, LA (US)

( * ) Notice: Subject to any disclaimer, the term of this patent is extended or adjusted under 35 U.S.C. 154(b) by 323 days.

(21) Appl. No.: 12/557,092

(22) Filed: Sep. 10, 2009

(65) Prior Publication Data

US 2011/0056807 A1    Mar. 10, 2011

(51) Int. Cl.
    *B65G 17/24* (2006.01)
(52) U.S. Cl. ........................ 198/779; 198/853
(58) Field of Classification Search .................. 198/779, 198/850–853
    See application file for complete search history.

(56) References Cited

U.S. PATENT DOCUMENTS

| | | | |
|---|---|---|---|
| 4,231,469 A | 11/1980 | Arscott | |
| 6,138,820 A | 10/2000 | Ewert | |
| 6,148,990 A * | 11/2000 | Lapeyre et al. | 198/779 |
| 6,209,714 B1 * | 4/2001 | Lapeyre et al. | 198/779 |
| 6,318,544 B1 | 11/2001 | O'Connor et al. | |
| 6,494,312 B2 * | 12/2002 | Costanzo | 198/779 |
| 6,571,937 B1 * | 6/2003 | Costanzo et al. | 198/779 |
| 6,874,617 B1 | 4/2005 | Layne | |
| 6,932,211 B2 | 8/2005 | Wieting | |
| 6,968,941 B2 | 11/2005 | Fourney | |
| 6,997,309 B2 | 2/2006 | Stebnicki et al. | |
| 7,137,505 B2 | 11/2006 | Stebnicki et al. | |
| 7,246,700 B2 * | 7/2007 | Stebnicki et al. | 198/853 |
| 7,249,669 B2 | 7/2007 | Fourney | |
| 7,249,671 B2 * | 7/2007 | Riddick et al. | 198/457.05 |
| 7,331,448 B2 | 2/2008 | Stebnicki et al. | |
| 7,344,018 B2 | 3/2008 | Costanzo et al. | |
| 7,360,641 B1 * | 4/2008 | Fourney | 198/779 |
| 7,364,038 B2 | 4/2008 | Damkjaer | |
| 7,461,739 B2 | 12/2008 | Fourney | |
| 7,506,751 B2 | 3/2009 | Fourney | |
| 7,527,143 B2 | 5/2009 | Krisl et al. | |
| 7,527,146 B2 | 5/2009 | Stebnicki et al. | |
| 7,556,136 B2 | 7/2009 | Marshall et al. | |
| 7,588,137 B2 * | 9/2009 | Fourney | 198/779 |
| 7,617,923 B2 * | 11/2009 | Riddick et al. | 198/457.05 |
| 7,731,010 B2 * | 6/2010 | Kissee et al. | 198/370.09 |
| 7,850,001 B2 | 12/2010 | Krisl | |
| 8,109,384 B2 * | 2/2012 | Pressler et al. | 198/779 |
| 2009/0260957 A1 | 10/2009 | Krisl | |

OTHER PUBLICATIONS

ISA/EP International Search Report and Written Opinion of the International Searching Authority of PCT/US10/48084, mailed Jan. 19, 2011, European Patent Office, Rijswijk, NL.

* cited by examiner

*Primary Examiner* — Douglas Hess
(74) *Attorney, Agent, or Firm* — James T. Croavich

(57) ABSTRACT

A conveyor, a conveyor belt used in the conveyor, and a belt module used to construct the conveyor belt, in which the module includes belt rollers that extend outward of a conveyor surface of the modules to support conveyed articles. The belt rollers are mounted in cavities in the modules that open onto the conveying surface and a recessed surface recessed inward of an outermost surface opposite the conveying surface through the thickness of the modules. Bearing surfaces, such as the peripheries of conveyor rollers underlying the conveyor belt along a carryway run, extend into the conveyor belt past the outer surface to contact the belt rollers. As the belt advances, the belt rollers rotate on the bearing surfaces to push conveyed articles along or across the belt.

13 Claims, 2 Drawing Sheets

CONVEYORS, BELTS, AND MODULES WITH ACTUATED ROLLERS

BACKGROUND

The invention relates to power-driven conveyors generally and, more specifically, to conveyors constructed of modular plastic conveyor belts with embedded article-supporting rollers.

Conveyor belts with article-supporting rollers that extend through the thickness of the belt are used in the material-handling industry to accelerate, divert, sort, merge, and otherwise move articles along and across a moving conveyor belt. The rollers are arranged to rotate in line with or perpendicular or oblique to the direction of belt travel. When the peripheries of the rollers extending past the bottom of the conveyor belt are engaged by a bearing surface as the belt advances, the rollers ride on the bearing surfaces and rotate to push articles being conveyed atop the rollers in a selected direction. Examples of conveyors using belts of this kind are described in, for example, U.S. Pat. Nos. 6,494,312; 6,968,941; and 7,461,739.

In some cases, however, it may be preferable not to have the belt rollers define the bottom-most extent of the belt. For example, during assembly of a belt of this kind on a table, the belt can roll on its rollers. Unless blocked from rolling by some fixture or retainer, the belt can be difficult to assemble.

SUMMARY

This shortcoming is overcome by a conveyor belt embodying features of the invention. One version of such a conveyor belt comprises a series of belt modules linked together at hinges. The belt has a first side and an opposite second side through the thickness of the belt modules. A conveying surface is formed on the first side, and an outermost surface is formed on the second side. Recessed surfaces at the second side are recessed inward of the outermost surface. The recessed surfaces extend the lengths of the modules. Cavities open onto the conveying surface on the first side and the recessed surfaces on the second side. Belt rollers mounted in the cavities extend outward of the cavities past the conveying surface and the recessed surfaces and are recessed inward of the outermost surface at the second side of the belt.

In another aspect of the invention, a conveyor embodying features of the invention includes a conveyor belt as described and bearing surfaces that extend into contact with the recess rollers at the second side of the belt.

Another version of a conveyor embodying features of the invention comprises a conveyor belt that extends in thickness from a first side to an opposite second side. The belt has a conveying surface on the first side and an outermost surface at the second side. Belt rollers are recessed into the conveyor belt inward of the outermost surface at the second side and extend outward of the conveyor belt past the conveying surface at the first side. Bearing surfaces are arranged to extend into the conveyor belt at the second side to contact the belt rollers, which are recessed into the conveyor belt.

In another aspect of the invention, a conveyor belt module embodying features of the invention comprises a first surface and an opposite second surface defining the thickness of the module, which extends in the length direction from a first end to a second end. A recessed surface that is recessed inward of the second surface extends in the length direction from the first end to the second end of the module. A cavity extends through the thickness of the module and opens onto the first surface and the recessed surface. A belt roller mounted in the cavity extends outward of the cavity past the first surface and the recessed surface and is recessed inward of the second surface.

BRIEF DESCRIPTION OF THE DRAWINGS

These features and aspects of the invention, as well as its advantages, are better understood by referring to the following description, appended claims, and accompanying drawings, in which:

DETAILED DESCRIPTION

Figure 1A:
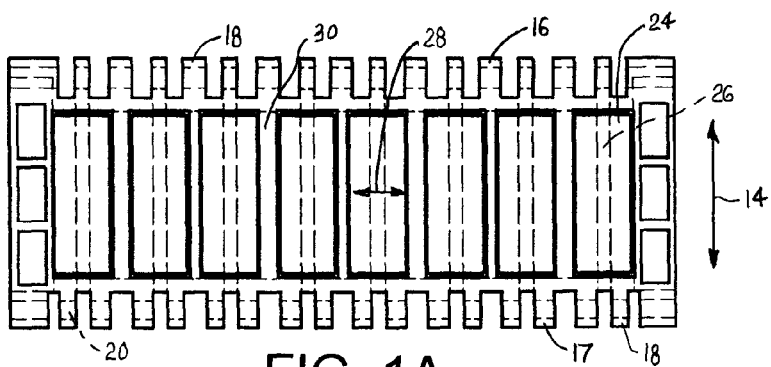
FIGS. 1A-1C are top plan, front elevation, and side elevation views of one version of a conveyor belt module embodying features of the invention.
Figure 1B:
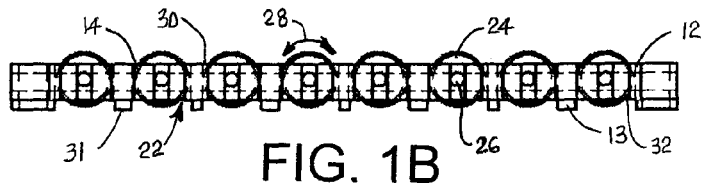
Figure 1C:
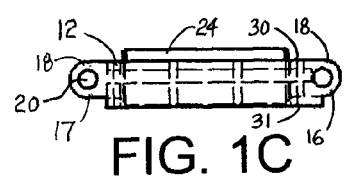

One version of a belt module embodying features of the invention is shown in FIGS. 1A-1C. The belt module 10 extends in thickness from a first side 12 to an opposite second side 13 in a length direction 14 from a first end 16 to an opposite second end 17. Hinge elements 18 are spaced apart laterally along the first and second ends. Each hinge element has a hole 20 aligned laterally with the holes of the other hinge elements along that end of the module. Cavities 22 extend through the thickness of the module from the first side to the second side. A belt roller 24, elongated in the length direction of the module, is mounted in each cavity on an axle 26 that spans the cavity. In this example, the axle is parallel to the length direction of the module. Consequently, when actuated, the roller rotates as shown by two-sided arrow 28 to push articles conveyed atop the rollers toward one lateral side of the belt or the other.

A conveying surface 30 is formed on the first side of the belt module. The conveying surface is not continuous because it is interrupted by the cavities 22 that open onto it. The conveying surface extends from an interior portion of the module bounding the cavities and out onto the hinge elements 18. The opposite side of the module, i.e., the bottom side in FIGS. 1B and 1C, is characterized by an outermost surface 31. The outermost surface at the bottom, second side of the module, comprises a plurality of individual unconnected segments that are flush with each other and define the module's outermost surface. When the belt module rests with its second side on a flat supporting surface, the flush outermost surface is in contact with the flat supporting surface. Recessed inward of the outermost surface on the second side of the belt module are recessed surfaces 32. The recessed surfaces separate the segments forming the outermost surface from each other. The recessed surfaces extend the length of the module from the first end to the second end. The recessed surfaces are spaced apart laterally in line with the cavities, which open onto the recessed surfaces on the second side of the module. The recessed surfaces may also be described as the bottoms of slots formed in the outermost surface from the first end to the second end of the module in line with the cavities.

The belt rollers 24 extend from the cavities 22 outward past the conveying surface 30 on the first side of the belt and past the recessed surfaces 32 on the second side of the belt, but not past the outermost surface 31. In this way, the belt module sits with its outermost surface, and not its rollers, supported on a table top. As best seen in FIGS. 1B and 1C, the hinge pin 26 is also recessed more deeply into the module from the second side than are the belt rollers.

Figure 2A:
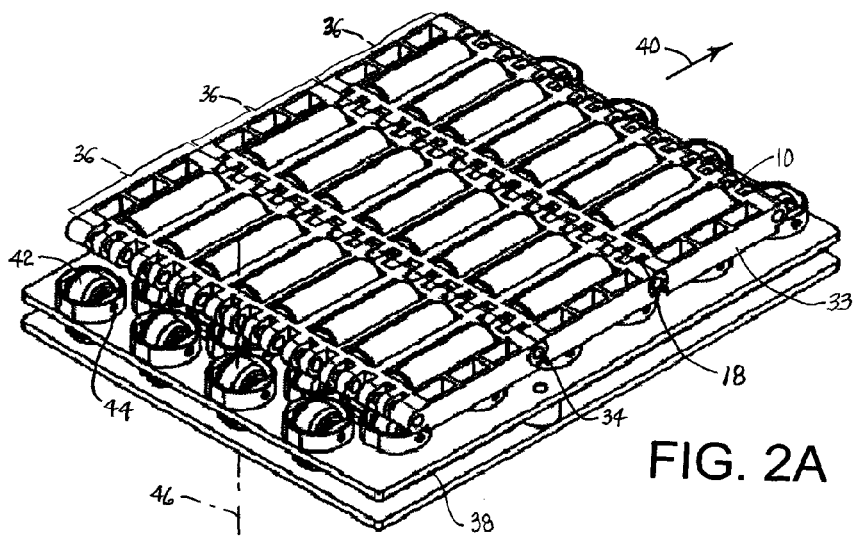
FIGS. 2A and 2B are isometric and front elevation views of a portion of a conveyor using a conveyor belt constructed of modules as in FIGS. 1A-1C.

As shown in FIG. 2A, the module may be joined serially to other modules into a conveyor belt 33 by means of hinge pins 34 received in the aligned holes through the interleaved hinge elements 18 of adjacent modules 10. Joined modules are able to pivot about the laterally arranged pins to articulate about sprockets or bend backwards around return rollers or shoes in a conveyor return path. The portion of the conveyor belt shown in FIG. 2A includes three rows 36 of one module each linked together in series. But wider belts can be built with multiple modules laid side-by-side in each row, preferably in a bricklay pattern.

Figure 2B:
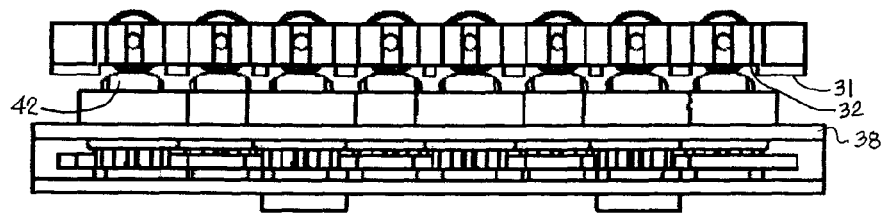

The conveyor belt 33 is supported in at least a portion of its carryway run atop a roller-actuating mechanism 38, which is mounted in a conveyor frame (not shown) along a carryway portion of the belt's conveying path. The belt advances on the roller-actuating mechanism in a direction of belt travel 40. Details of an exemplary roller-actuating mechanism are given in U.S. Pat. No. 7,506,751, which is incorporated by reference into this disclosure. The mechanism comprises an array of conveyor rollers 42 rotatable on axles 44. The conveyor rollers extend into the conveyor belt past the outermost surface 31 into contact with the belt rollers 24. The orientation of the conveyor rollers may be changed by rotating the rollers about a vertical axis 46. With the conveyor rollers 42 oriented as in FIGS. 2A and 2B, i.e., perpendicular to the orientation of the belt rollers 24, the belt rollers ride along the conveyor rollers without rotating themselves as the conveyor belt advances in the direction of belt travel. If the conveyor rollers are rotated about the vertical axis to an orientation to one side or the other of the position in FIGS. 1A and 1B, the belt rollers ride on the conveyor rollers as the belt advances and rotate to one side or the other. Likewise, the conveyor rollers rotate by their rolling interaction with the belt rollers. Thus, the peripheries of the conveyor rollers 42 act as bearing surfaces on which the belt rollers 24 ride as the belt advances.

Figure 3A:
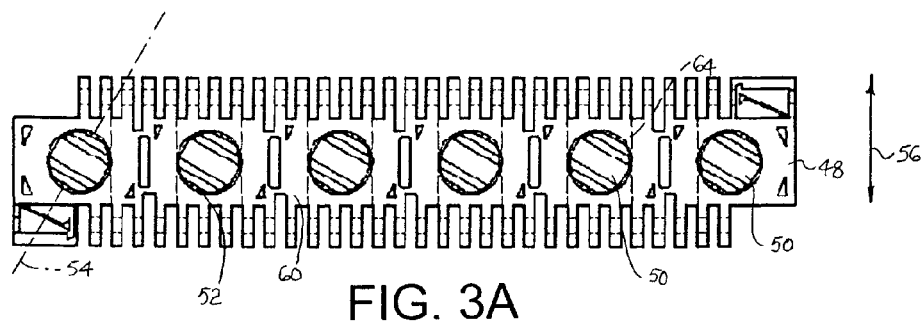
FIGS. 3A-3C are top plan, front elevation, and side elevation views of another version of a conveyor belt module embodying features of the invention.
Figure 3B:
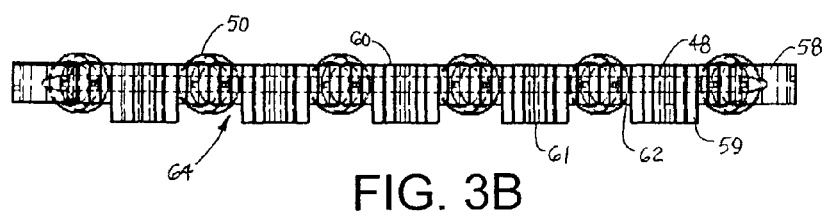
Figure 3C:
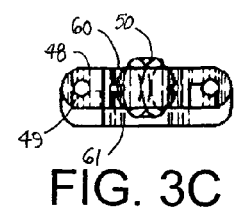

Another version of a conveyor belt module embodying features of the invention is shown in FIGS. 3A-3C. The module 48, which includes hinge elements 49 at each end like the module of FIG. 1, has cylindrical belt rollers 50 mounted in cavities 52 on axles oriented along an axis 54 oblique to the length direction 56 of the module. Unlike the belt rollers in FIGS. 1A-1C, the belt rollers 50 are not elongated. The belt module extends in thickness from a first side 58 to an opposite second side 59. A conveying surface is formed on the first side. An outermost surface is formed on the second side. Recessed surfaces 62 recessed inward of the outermost surface on the second side are laterally aligned with the positions of the belt rollers. The recessed surfaces constitute the bottoms of slots 64 having a lateral width accommodating the protrusion of a salient portion of the belt rollers and extending the entire length of the module in the length direction 56. The belt rollers protrude outward of the conveying surface 60 as well, but not past the outermost surface 61. The module interconnects with other similar modules end to end and side by side into a modular conveyor belt in the same general way as the modules of FIGS. 1 and 2.

Figure 4A:
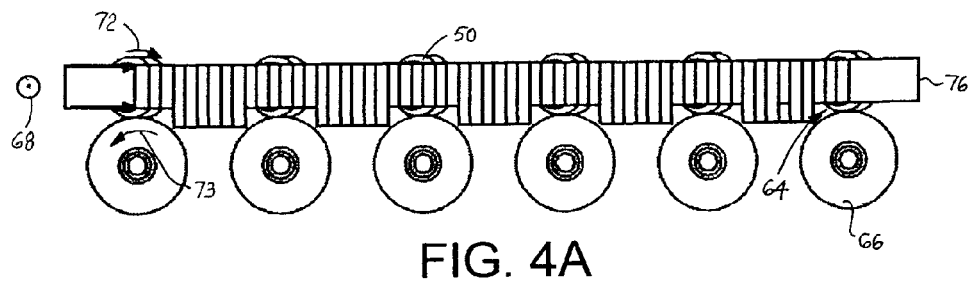
FIGS. 4A and 4B are front elevation and side elevation views of a portion of a conveyor using a conveyor belt constructed of modules as in FIGS. 3A-3C.
Figure 4B:
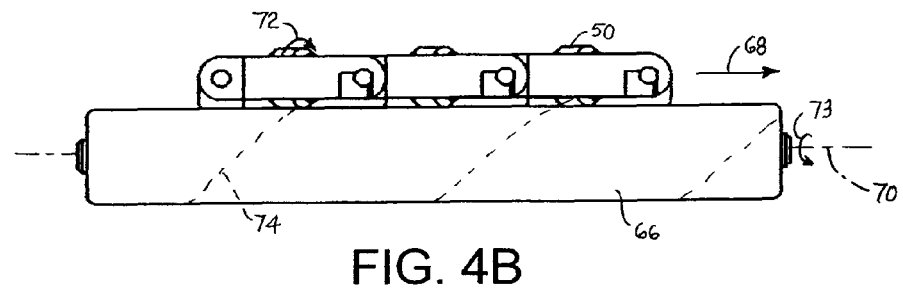

The oblique belt rollers 50 are actuated by elongated conveyor rollers 66, as shown in FIGS. 4A and 4B. One example of such an arrangement of conveyor rollers providing bearing surfaces for oblique belt rollers is described in more detail in U.S. Pat. No. 6,968,941, incorporated into this disclosure by reference. The conveyor rollers, whose axes of rotation 68 are parallel to the direction of belt travel 70, are mounted in the conveyor frame underlying the carryway run of the belt across its width. The conveyor rollers extend into the slots 64 and contact the belt rollers 50. As the conveyor belt advances in the direction of belt travel 68, friction between the belt rollers 50 and the conveyor rollers 66 causes them to rotate on each other in the directions indicated by arrows 72 and 73. The obliquely arranged belt rollers 50 follow a helical path 74 around the peripheries of the conveyor rollers 66. The rotation of the oblique belt rollers pushes articles conveyed atop the rollers toward the right-hand side 76 of the belt in FIG. 4A as they are conveyed forward by the belt.

Both belt modules described in FIGS. 1 and 3 are preferably modular plastic conveyor belts injection-molded out of a thermoplastic polymer, such as polypropylene, polyethylene, acetal, or a composite material. The belt rollers may also be molded or formed out of a plastic material and may include an elastomeric or rubber outer periphery for better grip on the conveyor rollers. The belt-roller axles are preferably made of stainless steel and are received in central bores through the belt rollers. The conveyor rollers that provide the bearing surfaces may be short caster rollers as in FIG. 2B or longer rollers as in FIG. 4B. A urethane outer surface on the conveyor rollers provides high friction for a good grip on the belt rollers and durability.

Although the invention has been described in detail with reference to a couple of preferred versions, other versions are possible. For example, rollers whose axes are perpendicular to the direction of belt travel to accelerate supported articles forward along the conveyor belt as it advances could be used. In such a case, the bearing surfaces could be the upper surfaces of static, flat wear strips aligned in the direction of belt travel under the lanes of belt rollers in place of the conveyor rollers of FIG. 4A. So, as these examples suggest, the scope of the invention is not meant to be limited to the details of the examples disclosed.

What is claimed is:

1. A conveyor comprising:
   a conveyor belt extending in thickness from a first side to an opposite second side and having a conveying surface on the first side and an outermost surface on the second side with parallel slots formed in the outermost surface;
   belt rollers extending outward of the conveyor belt past the conveying surface on the first side and into the parallel slots on the second side;
   bearing surfaces arranged to extend into the parallel slots in the conveyor belt at the second side to contact the belt rollers recessed into the conveyor belt.

2. A conveyor as in claim 1 wherein the bearing surfaces comprise the peripheral surfaces of conveyor rollers.

3. A conveyor as in claim 2 wherein the conveyor rollers rotate on first axes and the belt rollers rotate on second axes not parallel to the first axes.

4. A conveyor as in claim 1 wherein the conveyor belt further comprises cavities extending through the thickness of the conveyor belt and opening onto the conveying surface on the first side and the outermost surface on the second side, wherein the belt rollers are mounted in the cavities.

5. A conveyor as in claim 4 wherein the conveyor belt further includes inwardly recessed surfaces on the second side forming the parallel slots in the outermost surfaces, wherein the parallel slots intersect cavities aligned along the length of the conveyor belt.

6. A conveyor belt as in claim 1 wherein the conveyor belt comprises a series of rows of belt modules having hinge elements spaced apart laterally along opposite ends of the belt modules and a plurality of hinge pins linking the rows of belt modules together end to end between consecutive rows, wherein the hinge pins are recessed inwardly more deeply than the belt rollers from the outermost surface.

7. A conveyor comprising:
a conveyor belt including:
a series of belt modules hingedly linked together by hinge pins into a conveyor belt having:
a first side and an opposite second side through the thickness of the belt modules;
a conveying surface on the first side and an outermost surface on the second side;
recessed surfaces recessed inward of the outermost surface on the second side and forming slots in the outermost surface extending the length of the conveyor belt modules; and
cavities opening onto the conveying surface on the first side and into the slots on the second side;
a plurality of belt rollers mounted in the cavities, wherein the belt rollers extend outward of the cavities past the conveying surface and the recessed surfaces and are recessed inward from the outermost surface in the slots;
bearing surfaces extending outward into contact with the recessed belt rollers in the slots at the second side of the conveyor belt.

8. A conveyor as in claim 7 wherein the hinge pins are recessed more deeply from the inner surface than are the belt rollers.

9. A conveyor as in claim 7 wherein the slots formed in the outermost surface are parallel to each other.

10. A conveyor as in claim 7 wherein the bearing surfaces comprise the peripheral surfaces of conveyor rollers.

11. A conveyor belt comprising:
a series of belt modules hingedly linked together into a conveyor belt including:
a first side and an opposite second side through the thickness of the belt modules;
a conveying surface on the first side and an outermost surface on the second side;
recessed surfaces recessed inward of the outermost surface on the second side and forming slots in the outermost surface extending the length of the belt modules; and
cavities opening onto the conveying surface on the first side and into the slots on the second side;
a plurality of belt rollers mounted in the cavities, wherein the belt rollers extend outward of the cavities past the conveying surface and the recessed surfaces and are recessed inward from the outermost surface in the slots.

12. A conveyor belt as in claim 11 wherein the belt modules are hingedly linked together by hinge pins that are recessed more deeply from the outermost surface than are the belt rollers.

13. A conveyor belt module comprising:
a first surface and an opposite second surface defining the thickness of the conveyor belt module and extending in a length direction between a first end and a second end;
a recessed surface recessed inward of the second surface and forming a slot in the second surface extending in the length direction from the first end to the second end of the conveyor belt module;
a cavity extending through the thickness of the conveyor belt module and opening onto the first surface and into the slot; and
a belt roller mounted in the cavity, wherein the belt roller extends outward of the cavity past the first surface and the recessed surface to a position recessed inward of the second surface in the slot.

* * * * *